United States Patent
Subramanian et al.

(10) Patent No.: US 11,972,610 B2
(45) Date of Patent: Apr. 30, 2024

(54) MULTI-PASS OBJECT TRACKING SYSTEM UTILIZING SINGLE OBJECT TRACKING IN A MULTI OBJECT TRACKING USE CASE FOR HIGHER ACCURACY

(71) Applicant: Sensormatic Electronics, LLC, Boca Raton, FL (US)

(72) Inventors: Gopi Subramanian, Boca Raton, FL (US); Joseph Celi, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 246 days.

(21) Appl. No.: 17/472,150

(22) Filed: Sep. 10, 2021

(65) Prior Publication Data

US 2022/0083785 A1 Mar. 17, 2022

Related U.S. Application Data

(60) Provisional application No. 63/077,473, filed on Sep. 11, 2020.

(51) Int. Cl.
| | |
|---|---|
| G06K 9/00 | (2022.01) |
| G06F 18/22 | (2023.01) |
| G06N 3/04 | (2023.01) |
| G06T 7/20 | (2017.01) |
| G06V 20/40 | (2022.01) |

(52) U.S. Cl.
CPC .............. *G06V 20/48* (2022.01); *G06F 18/22* (2023.01); *G06N 3/04* (2013.01); *G06T 7/20* (2013.01)

(58) Field of Classification Search
None
See application file for complete search history.

(56) References Cited

U.S. PATENT DOCUMENTS

| | | | |
|---|---|---|---|
| 8,224,029 B2 | 7/2012 | Saptharishi et al. | |
| 9,436,895 B1* | 9/2016 | Jones | G06N 3/045 |
| 10,872,424 B2 | 12/2020 | Daniel et al. | |
| 11,004,209 B2 | 5/2021 | Chen et al. | |
| 2018/0374233 A1* | 12/2018 | Zhou | G06F 18/22 |

* cited by examiner

*Primary Examiner* — Soo Jin Park
(74) *Attorney, Agent, or Firm* — ARENTFOX SCHIFF LLP

(57) ABSTRACT

A system may be configured to perform enhanced detection of occluded objects in a multiple object detection system. In some aspects, the system may detect a plurality of current objects in a current video frame, generate initial object identifier mapping information assigning a candidate object identifier to a first object of the plurality of current objects, and detect a multi-object tracking (MOT) inaccuracy condition. Further, the system may generate a current fingerprint corresponding to the first object of the plurality of current objects, identify an assignment error based on comparing the current fingerprint to historic fingerprints associated with a plurality of historic objects detected in a previous frame, generate updated object identifier mapping information based on the assignment error, and displaying the current video frame based on the updated object identifier mapping information.

20 Claims, 5 Drawing Sheets

MULTI-PASS OBJECT TRACKING SYSTEM UTILIZING SINGLE OBJECT TRACKING IN A MULTI OBJECT TRACKING USE CASE FOR HIGHER ACCURACY

CROSS-REFERENCE TO RELATED APPLICATION

This application claims priority to U.S. Application No. 63/077,473, entitled "MULTI-PASS OBJECT TRACKING SYSTEM UTILIZING SINGLE OBJECT TRACKING IN A MULTI OBJECT TRACKING USE CASE FOR HIGHER ACCURACY," filed on Sep. 11, 2020, the disclosure of which is incorporated by reference herein in its entirety.

BACKGROUND

The present disclosure relates generally to multiple object tracking systems (MOTS), and more particularly, to methods and systems for multi-pass multiple object tracking utilizing single object tracking in a multiple object tracking use case for higher accuracy.

Typically, a MOT may employ a per-frame approach to track movement of multiple objects in a video feed. For example, a MOT may store tracking information at a frame level and generate bounding boxes for the objects detected in each frame. However, the per-frame approach of current MOTs is prone to inaccuracy and/or unreliability in a variety of contexts. For example, MOTs often fail to accurately detect objects due to object occlusion, objects crossings paths, objects appearing different from different viewpoints, and video feed issues (e.g., a scale change, motion blur, or illumination issues). Furthermore, per-frame approaches may be inefficient or ineffective when attempting to track objects across multiple cameras.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods for multi-pass object tracking utilizing single object tracking in a multi-object tracking use case for higher accuracy. In an aspect, a method for multi-pass multi-object tracking may comprise determining, via an object detection system, a plurality of current object representations corresponding to a plurality of current objects detected in a current video frame captured by a video capture device; generating, via a tracking system using the plurality of object representations, object identifier mapping information, the object identifier mapping information assigning a current object identifier to a current object representation of the plurality of current object representations; identifying, via a similarity platform, a historic object representation that matches the current object representation, the historic object representation detected by the object detection system in an earlier video frame captured by the video capture device; determining that the current object identifier does not match a historic object identifier assigned to the historic object representation; and updating the object identifier mapping information to indicate that the historic object identifier is assigned to the current object representation.

The present disclosure includes a system having devices, components, and modules corresponding to the steps of the described methods, and a computer-readable medium (e.g., a non-transitory computer-readable medium) having instructions executable by a processor to perform the described methods. In some aspects, non-transitory computer-readable media may exclude transitory signals.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
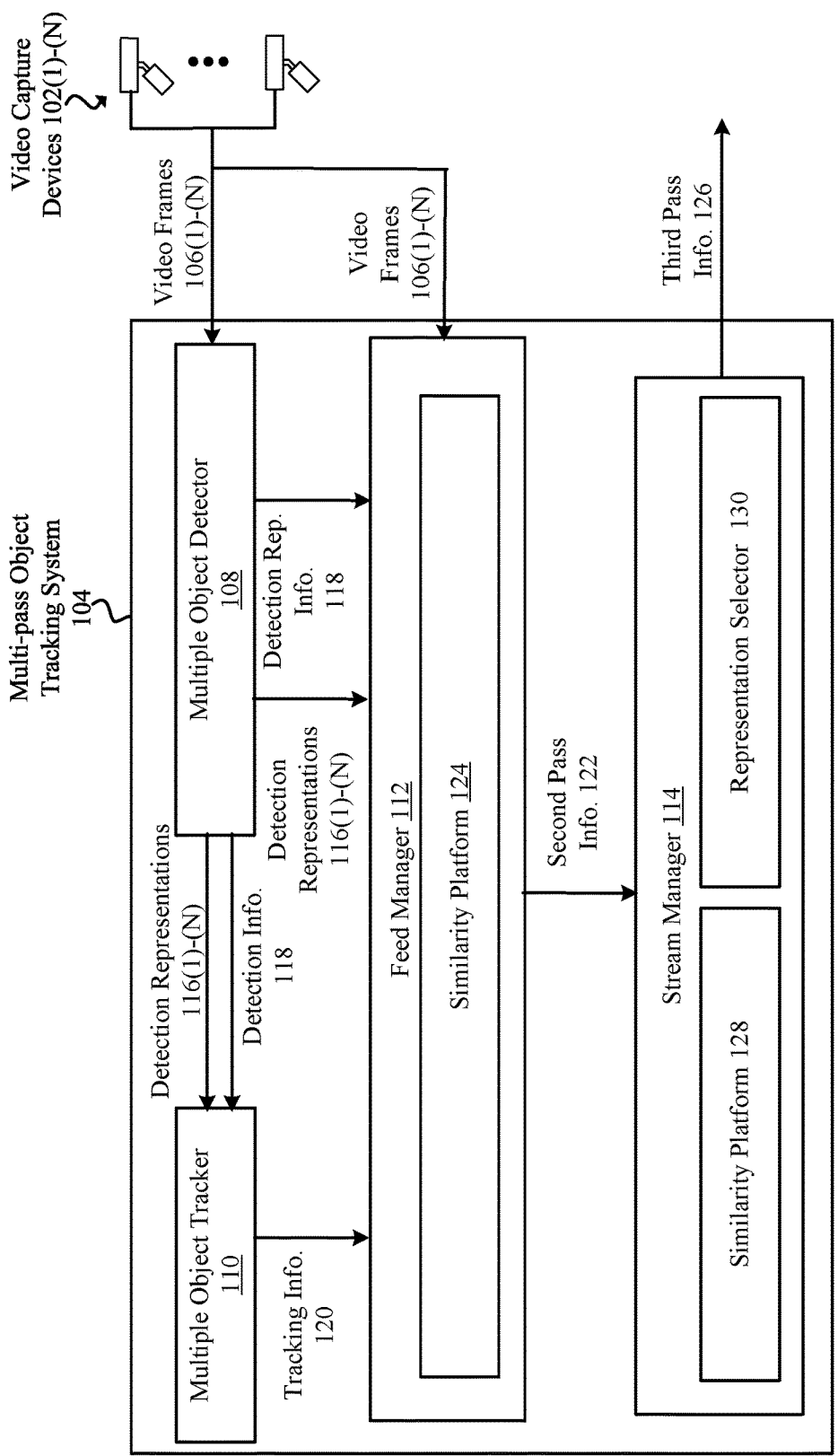
FIG. 1 is a data flow diagram illustrating an example data flow for multi-pass object tracking, according to some implementations.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Implementations of the present disclosure provide systems, methods, and apparatuses that provide multi-pass multiple object tracking utilizing single object tracking. These systems, methods, and apparatuses will be described in the following detailed description and illustrated in the accompanying drawings by various modules, blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

In some implementations, one or more problems solved by the present solution is accurate multiple object tracking. For example, this present disclosure describes systems and methods for multi-pass object tracking configured to perform a first pass using a multi-object tracker implementing a per-frame approach to determine first pass information, perform a second pass employing a similarity platform (e.g., a similarity platform based on image similarity, motion estimation, human pose estimation, etc.) to verify the first pass information, and perform an optional third pass to stitch and correlate the second pass information from different video capture devices in configurations with multiple video capture devices (e.g., video cameras, satellite cameras, etc.). In some aspects, the different passes can be performed on different systems. In addition, the first pass information may be used in systems with real-time constraints or reduced accuracy requirements, while the second pass information and third pass information may be generated in real-time or offline and used in contexts without real-time constraints and/or with more demanding accuracy requirements. The present solution provides improved accuracy and consistency for multi-object tracking by verifying and refining unreliable data resulting from a per-frame approach, using a similarity platform.

Referring to FIG. 1, in one non-limiting aspect, a system 100 is configured to perform multi-pass multiple object tracking. As illustrated in FIG. 1, the system 100 may include a plurality of video capture devices 102(1)-(N) and a multi-pass object tracking system 104. In some aspects, the video capture devices 102(1)-(N) may be configured to capture video feeds of object activity within a monitored area. In some examples, the monitored area may be a retail environment and the objects may be customers and/or retail items offered for sale within the monitored area. For instance, the customers may be currently shopping within the monitored area. In some other examples, the monitored area may be a security checkpoint, and the objects may be automobiles traveling through the security checkpoint. In some other aspects, the video capture devices 102(1)-(N) may be satellite cameras providing satellite images of a monitored area.

As a result, the video capture devices 102(1)-(N) may capture video frames 106(1)-(N) including object activity within the monitored area, and send the video frames 106(1)-(N) to the multi-pass object tracking system 104. In some aspects, the multi-pass object tracking system 104 may be configured to detect multiple objects within the video frames 106(1)-(N), and track the movement of the objects within the video frames 106(1)-(N). For example, the multi-pass object tracking system 104 may be configured to detect customers, employees, and/or retail items within the video frames 106(1)-(N), and track the movement of the customers, employees, and retail items within the monitored area using the video frames 106(1)-(N). In some aspects, the multi-pass object tracking system 104 may be configured to determine a customer journey through different areas of a store captured by the plurality of video capture devices 102(1)-(n). In some aspects, the multi-pass object tracking system 104 may be configured to implement a surveillance system to prevent theft of the retail items offered for sale within the monitored area.

As illustrated in FIG. 1, the multi-pass object tracking system 104 may include a multiple object detector 108, a multiple object tracker 110, a feed manager 112, and a stream manager 114. The multiple object detector 108 may be configured to detect objects within the video frames 106(1)-(N). For example, the multiple object detector 108 may be configured to detect customers within the video frames 106(1)-(N). In some aspects, the multiple object detector 108 may employ a convolution neural network to detect objects within the video frames 106(1)-(N). Additionally, or alternatively, the multiple object detector 108 may employ one or more other machine learning (ML) techniques to detect objects within the video frames 106(1)-(N).

In some aspects, the multiple object detector 108 may be configured to determine a detection representation 116 (e.g., a bounding box) for each detected object. For example, the multiple object detector 108 may generate five detection representations 116(9)-(13) for five customers detected within the video frame 106(2). In addition, the multiple object detector 108 may provide the detection representations 116(1)-(N) and detection representation information 118 to the multiple object tracker 110. In some aspects, the detection representation information 118 may include a predicted class of a detected object and a confidence score representing the likelihood that the detected object belongs to the class. In some aspects, the multiple object detector 108 may employ a machine learning model to determine the confidence value, and determine the predicted class based at least in part on the confidence value being greater than a threshold amount or higher than another confidence value associated with a different class.

In some aspects, the multiple object tracker 110 may be a trajectory-based multiple object tracker or a visual-based multiple object tracker. In some instances, the multiple object tracker 110 may be configured to generate tracking information 120 indicating the trajectory of the objects detected by the multiple object detector 108 within the video frames 116(1)-(N). For example, the tracking information 120 may include data representing the trajectory of the five customers between the video frames 106(1)-(2) based on the movement of detection representations 116 corresponding to the customers between the video frames 106(1)-(2). In some other instances, the multiple object tracker 110 may be configured to generate tracking information 120 indicating the objects detected via image recognition by the multiple object detector 108 within the video frames 116(1)-(N). For example, the tracking information 120 may include data representing the presence of the five customers between the video frames 106(1)-(2) based on the visual recognition of detection representations 116 corresponding to the customers between the video frames 106(1)-(2). In particular, the multiple object tracker 110 may determine if each of the current detection representations 116(9)-(13) within the video frame 106(2) corresponds to historic detection representations 116(1)-(4) detected within the preceding video frame 106(1). In some instances, the multiple object tracker 110 may employ the predicted class information and confidence score information to determine if a current detection representation has a corresponding historic detection representation.

Further, the multiple object tracker 110 may assign object identifiers to the detection representations 116(1)-(N) within the tracking information 120. If the multiple object tracker 110 determines that a current detection representation 116(9) within the current video frame 106(2) has a corresponding historic detection representation 116(1) within a preceding video frame 106(1), the multiple object tracker 110 assigns the object identifier of the corresponding historic detection representation 116(1) to the current detection representation 116(9). If the multiple object tracker 110 determines that a current detection representation 116(13) does not have a corresponding historic detection representation in the preceding video frame 106(1), the multiple object tracker 110 assigns a new object identifier to the current detection representation 116(13). For example, the multiple object tracker 110 may determine that the detection representation 116(9) corresponding to the first customer detected within the video frame 106(2) corresponds to a historic detection representation 116(1) generated with respect to the video frame 106(1) based on a machine learning model and/or pattern recognition techniques. In response, the multiple object tracker 110 may assign the object identifier previously assigned to the to the detection representation 116(1) to the detection representation 116(9). Further, the multiple object tracker 110 may determine that the detection representation 116(13) corresponding to the fifth customer detected within the video frame 106(2) does not have a corresponding historic detection representation generated with respect to the video frame 106(1). In response, the multiple object tracker 110 may generate a new object identifier for the detection representation 116(13) corresponding to the fifth customer.

As illustrated in FIG. 1, the multiple object detector 108 and/or the multiple object tracker 110 may provide first pass information (e.g., the video frames 106(1)-(N), the detection representations 116(1)-(N), the detection representation information 118, and the tracking information 120) to the feed manager 112. In some aspects, for each detected object, the first pass information may include a stream identifier identifying a stream, one or more geographic zones, and/or a video capture device associated with the frame 106 containing the detected object, a frame identifier identifying the video frame 106 containing the detected object, a time stamp indicating the time of capture of the video frame containing the detected object, and object information for the detected object. In some aspects, the object information may include the detection representation 116 of the detected object, the object class identifier identifying a predicted class (i.e., type of the detected object) as determined by the multiple object detector 108, the object confidence score indicating the certainty that the detected object belongs to the object class associated with the object class identifier, and the object identifier assigned by the multiple object tracker 110. In some aspects, the multiple object detector 108 may employ a machine learning model to determine the confidence value, and determine the predicted class based at least in part on the confidence value being greater than a threshold amount or higher than another confidence value associated with a different class.

The feed manager 112 may be configured to detect and correct assignment errors made by the multiple object tracker 110 for video frames 106 received from the same video capture device 102. In particular, the feed manager 112 may generate second pass information 122 based on corrective updates to the first pass information (e.g., the video frames 106(1)-(N), the detection representations 116(1)-(N), the detection representation information 118, and the tracking information 120). In some aspects, the second pass information 122 includes the video frames 106(1)-(N). Further, for each detected representation 116, the second pass information 122 may include a stream identifier identifying a stream or video capture device associated with the video frame, a frame identifier identifying the video frame, a time stamp indicating the time of capture of the video frame, and object information for the object associated with the detection representation. In some aspects, the object information for a video frame 106 may include the detection representation 116, the object class identifier, the object confidence score, and the object identifier derived by the multiple object tracker 110 and a similarity platform 124. Further, the object confidence score may be based on the object confidence score of each of the detection representations 116 associated with the object. For example, the object confidence score may be equal to the average of the object confidence scores of all detection representations 116 associated with the detected object.

Upon receipt of the first pass information from the multiple object detector 108 and/or the multiple object tracker 110, the feed manager 112 may be configured generate the second pass information 122 by comparing the detection representations 116 of a video frame 106 to the historic detection representations 116 of the preceding video frame 106 via a similarity platform 124. For example, the feed manager 112 may compare a first detection representation 116(9) within the video frame 106(2) to the historic detection representations 116(1)-(4) of the video frame 106(1) via the similarity platform 124. In addition, as described herein, the multiple object tracker 110 may further employ timing information and location information obtained from the stream identifier to determine if a current detection representation (e.g., first detection representation 116(9) within the video frame 106(2)) has a corresponding historic detection representation among one or more historic detection representations (e.g., historic detection representations 116(1)-(4) of the video frame 106(1)). Further, the feed manager 112 may repeat the comparison process via the similarity platform 124 for the other detection representations 116(10)-(13) within the video frame 106(2) until the feed manager 112 verifies that each of the detection representations 116(9)-(13) of the video frame 106(2) has been correctly matched with one of the historic detection representations 114(1)-(4) from the preceding video frame 106(1) or the feed manager 112 determines that the particular detection representation 116 does not match any of the historic detection representations 116(1)-(4) of preceding video frame 106(1). Consequently, the similarity platform 124 may ensure accurate and consistent correlation between object identifiers and objects despite occlusion, incorrect object identifier assignment by the multiple object tracker 110, motion blur, changing viewpoints of an objects between the frames, scale changes, illumination issues, etc. In some aspects, the multiple object detector 108 and the multiple object tracker 110 may be combined into a single component configured to generate the detection representations 116(1)-(N), detection representation information 118, and the tracking information 120, and provide the detection representations 116(1)-(N), detection representation information 118, and the tracking information 120 to the feed manager 112. Further, in some aspects, the single component may be implemented by a deep neural network.

In some examples, the similarity platform 124 may implement at least one of a histogram based approach (e.g., conventional histogram intersection (HI), merged palette histogram matching (MPHM), gaussian weighted histogram intersection (GWHI), color ratio gradients (CRG), color edge co-occurrence histogram (CECH), etc.) customer feature based approach (e.g., scale-invariant feature transform (SIFT), histogram of gradients (HOG), etc.), distance metric learning approach (e.g., principal component analysis (PCA), linear discriminant analysis (LDA), neighborhood component analysis (NCA), large margin nearest neighbor (LMNN), etc.), and/or a deep neural network approach (e.g., a Siamese neural network). In some aspects, the similarity platform 124 may be based on image similarity, motion estimation, and/or human pose estimation. Further, in some aspects, feed manager 112 may be configured to provide the second pass information 122 to the stream manager 114. For example, the feed manager 112 may provide the second pass information 122 to the stream manager 114 in contexts employing two or more video capture devices 102.

The stream manager 114 may be configured to collate and coalesce video frames 106 received from two or more of the video capture devices 102(1)-(N). In particular, the stream manager 114 may generate third pass information 126 based on collating and coalescing the second pass information 122. Further, for each object, the third pass information 126 may include one or more time ranges where the object is captured on one of the video capture devices 102(1)-(N), one or more stream identifiers identifying the video capture devices 102(1)-(N) that captured the object, and object information. In some aspects, the object information may include each detection representation 116 representing the object, the object class identifier, the object confidence score, and the object identifier derived by the multiple object tracker 110, and a similarity platform 124. Further, the object confidence score may be based on the object confidence score of each of the detection representations 116 associated with the object. For example, the object confidence score may be equal to the average of the object confidence scores of all detection representations 116 associated with the detected object.

Upon receipt of the second pass information 122 from the feed manager 112, the stream manager 114 may be configured to generate the third pass information 126 by comparing the detection representations 116 of a video frame 106 to the historic detection representations of one or more preceding video frames 106 captured other video capture devices 102 via the similarity platform 128. In some aspects, the similarity platform 124 of the feed manager 112 may be different from the similarity platform 128 of the stream manager 114. As illustrated in FIG. 1, the stream manager may include a representation selector 130 configured to select detection representations from video frames 106(1)-(N) from the different video capture devices 102(1)-(N) to compare via the similarity platform 128.

For example, the representation selector 130 may select the historic detected representations 116(5)-(8) detected in video frame 106(3) captured by the video capture devices 104(2) based on time information or location information indicating that the video frame 106(3) temporally precedes the video frame 106(2) and/or was captured by the video capture device 102(2) having a location that causes the video capture device 102(2) to capture the similar objects as the video capture device 102(1). In some aspects, use of the time information, location information, and/or object information (e.g., object identifier, classification information) in a second pass or third pass may provide further error correction and improved accuracy. Further, the stream manager 114 may compare detection representations 106(9)-(13) of the video frame 106(1) captured at the video capture device 102(1) to the detected representations 116(5)-(8) of the video frame 106(3) via the similarity platform 128. Further, the stream manager 114 may repeat the comparison process via the similarity platform until each of the detection representations 106(9)-(13) of the video frame 106(2) has been matched with one of the historic detection representations 106(5)-(8) from the preceding video frames 106(2)-(3) or the stream manager 114 determines that the particular detection representation 116 does not correspond to one of the historic detection representations 106(5)-(8) within the preceding video frame 106(3). Consequently, the similarity platform 128 may ensure accurate and consistent correlation between object identifiers and objects despite occlusion, incorrect object identifier assignment by the multiple object tracker 110, motion blur, changing viewpoints of an objects between the frames, scale changes, illumination issues, etc. In some aspects, the second pass information and third pass information may be generated in real-time or offline and used in contexts without real-time constraints and/or with more demanding accuracy requirements. As a result, the present solution provides improved accuracy and consistency for multi-object tracking by verifying and refining unreliable data resulting from a per-frame approach, using a similarity platform.

In some examples of the similarity platform 128 may implement at least one of a histogram based approach (e.g., conventional histogram intersection (HI), merged palette histogram matching (MPHM), gaussian weighted histogram intersection (GWHI), color ratio gradients (CRG), color edge co-occurrence histogram (CECH), etc.) customer feature based approach (e.g., scale-invariant feature transform (SIFT), histogram of gradients (HOG), etc.), distance metric learning approach (e.g., principal component analysis (PCA), linear discriminant analysis (LDA), neighborhood component analysis (NCA), large margin nearest neighbor (LMNN), etc.), and/or a deep neural network approach (e.g., a Siamese neural network).

Figure 2:
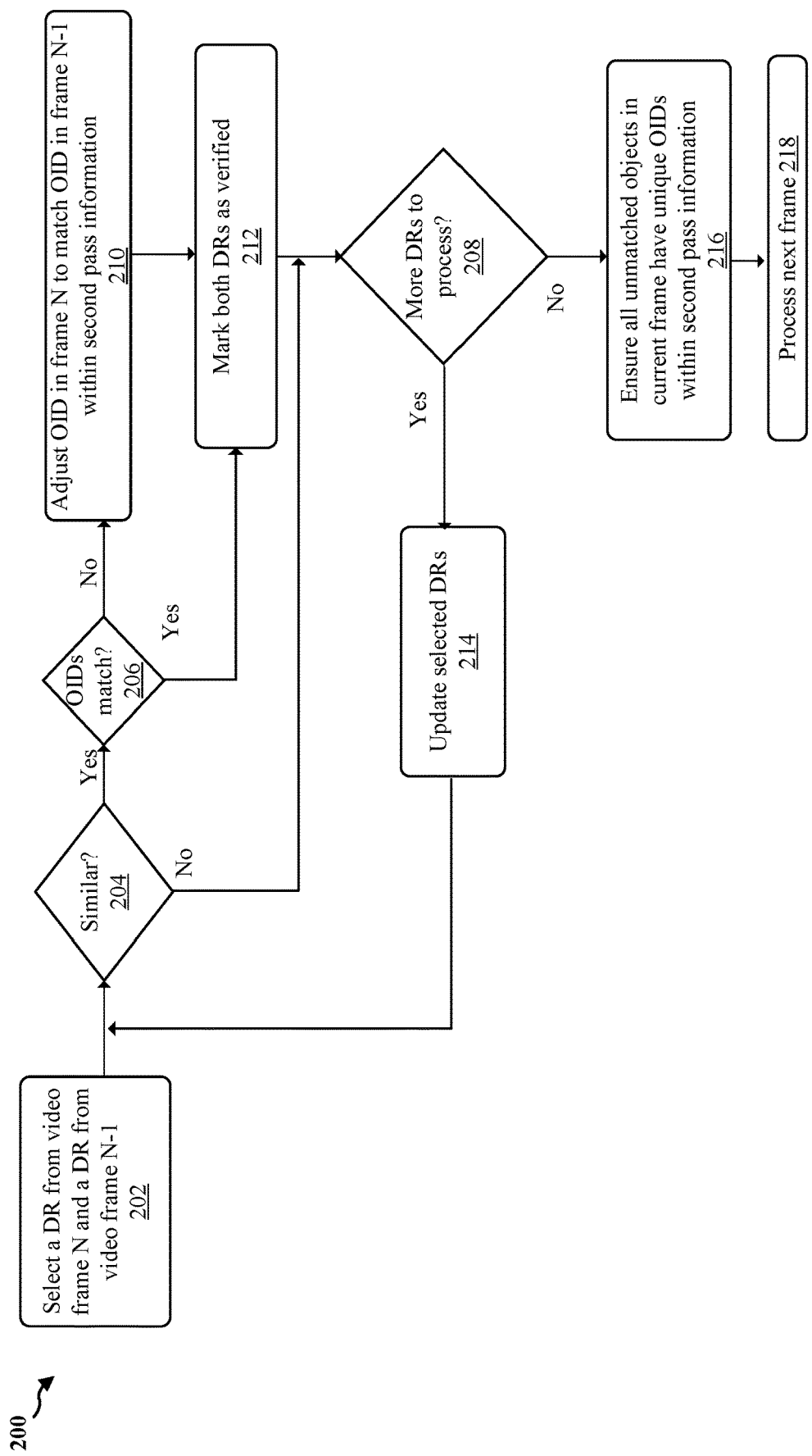
FIG. 2 is a flowchart of an example of a second pass in a multi-pass object tracking system, according to some implementations.

FIG. 2 is a flowchart of an example of a second pass in a multi-pass object tracking system, according to some implementations. At block 202, the multi-pass object tracking system 104 may select a detection representation (DR) for a current video frame and a detection representation for a previous video frame. For example, the feed manager 112 may select a detection representation 116(9) for a current video frame 106(2) and a detection representation 116(1) for a previous video frame 106(1). Although FIG. 2 illustrates selecting detection representations from a current frame and the video frame immediately preceding the current frame, in some aspects, the feed manager may select detection representations from a current video frame and any video frame preceding the current video frame.

At block 204, the multi-pass object tracking system 104 may determine whether the selected detection representations are similar. For example the feed manager 112 may employ the similarity platform 124 to determine whether the detection representation 116(9) corresponds to the detection representation 116(1). If the similarity platform 124 determines that the detection representation 116(9) corresponds to the detection representation 116(1), the multi-pass object tracking system 104 may proceed to block 206. If the similarity platform 124 determines that the detection representation 116(9) does not correspond to the detection representation 116(1), the multi-pass object tracking system 104 may proceed to block 208.

At block 206, the multi-pass object tracking system 104 may determine whether the object identifiers (OID) of the detection representations are the same. For example, the multi-pass object tracking system 104 may determine whether the multiple object tracker 110 assigned the same object identifier to the detection representation 116(1) and the detection representation 116(9). If the object identifiers of the detection representations 116(1) and 116(9) are not the same, the multi-pass object tracking system 104 may proceed to block 210. If the object identifiers of the detection representations 116(1) and 116(9) are the same, the multi-pass object tracking system 104 may proceed to block 212.

At block 210, the multi-pass object tracking system 104 may adjust the object identifier of the detection representation of the current video frame to match the object identifier of the detection representation of the previous video frame. For example, the feed manager 112 may update the object identifier of the detection representation 116(9) to match the object identifier of the detection representation 116(1). In particular, the multi-pass object tracking system 104 may update or generate second pass information 122 to reflect that the object identifier of the detection representation 116(9) is equal to the object identifier of the detection representation 116(1).

At block 212, the multi-pass object tracking system 104 may mark both detection representations as processed. For example, the multi-pass object tracking system 104 may update and finalize the object identifiers of the detection representations 116(1) and 116(9) within the second pass information 122. As result, neither of the detection representations 116(1) and 116(9) will be selectable by the feed manager 112 for the remainder of the comparison procedure performed over the detection representations of the current video frame and the previous video frame. At block 208, the multi-pass object tracking system 104 may determine whether there is an unverified detection representation within the current video frame and an unverified detection representation within the previous video frame that have not been compared. If the multi-pass object tracking system 104 determines there is a combination of unverified detection representations that have not been compared, the multi-pass object tracking system 104 may proceed to block 214. Otherwise, the multi-pass object tracking system 104 may proceed to block 216.

At block 214, the multi-pass object tracking system 104 may identify a combination of an unverified detection representation within the current video frame and an unverified detection representation within the previous video frame that have not been compared, and proceed to block 204 where the feed manager 112 may determine whether the combination of unverified detection representations are similar. For example, the feed manager 112 may determine that the detection representation 116(2) and detection representation 116(10) are both unverified and have not been compared. In response, the feed manager 112 may determine whether the detection representation 116(2) and detection representation 116(10) are similar via the similarity platform 124.

At block 216, the multi-pass object tracking system 104 may confirm that all of the remaining detection representations have a unique object identifier. For example, the feed manager 112 may determine that the detection representation 116(13) is the only detection representation 116 of the current video frame 106(2) that does not match one of the detection representation 116(1)-(4) of the previous video frame 106(1). Further, the feed manager 112 may confirm that the object identifier assigned to the detection representation 116(13) by the multiple object tracker 110 is not shared with any detection representations from the current video frame or previous video frame given that there feed manager 112 failed to identify a match with one of the detection representations 116(1)-(4) of the previous video frame 106(1).

At block 218, the multi-pass object tracking system 104 may process the next frame. For example, the video capture device 102(1) may capture the video frame 106(4). Further, the feed manager may perform the method 200 with the video frame 106(4) as the current video frame and the video frame 106(2) as the previous video frame.

Figure 3:
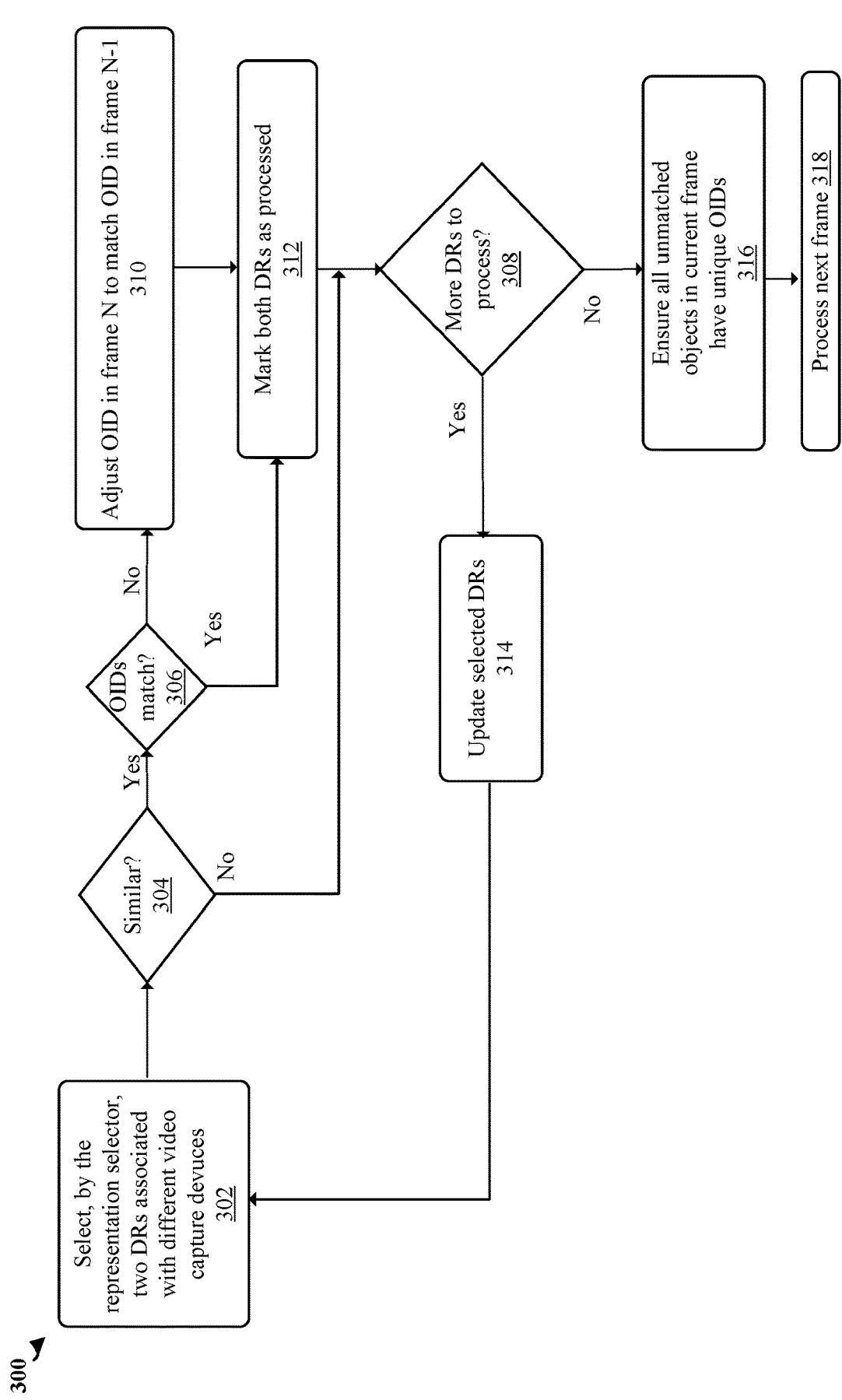
FIG. 3 is a flowchart of an example of a third pass in a multi-pass object tracking system, according to some implementations.

FIG. 3 is a flowchart of an example of a third pass in a multi-pass object tracking system, according to some implementations. At block 302, the multi-pass object tracking system 104 may select a detection representation for a current video frame of a first video capture device and a detection representation for a previous video frame of a second video capture device. For example, the representation selector 130 may select the detection representation 116(9) from the video frame 106(2) captured by the video capture device 102(1) and the historic detection representations 116(5) from the video frame 106(3) captured by the video capture devices 104(2). At block 304, the multi-pass object tracking system 104 may determine whether the selected detection representations are similar. For example the stream manager 114 may employ the similarity platform 128 to determine whether the detection representation 116(5) corresponds to the detection representation 116(9). If the similarity platform 128 determines that the detection representation 116(9) corresponds to the detection representation 116(5), the multi-pass object tracking system 104 may proceed to block 306. If the similarity platform 128 determines that the detection representation 116(9) does not correspond to the detection representation 116(5), the multi-pass object tracking system 104 may proceed to block 308.

At block 306, the multi-pass object tracking system 104 may determine whether the object identifiers (OID) of the detection representations are the same. For example, the multi-pass object tracking system 104 may determine whether the multiple object tracker 110 assigned the same object identifier to the detection representation 116(5) and the detection representation 116(9). If the object identifiers of the detection representations 116(5) and 116(9) are not the same, the multi-pass object tracking system 104 may proceed to 310. If the object identifiers of the detection representations 116(5) and 116(9) are the same, the multi-pass object tracking system 104 may proceed to 312.

At block 310, the multi-pass object tracking system 104 may adjust the object identifier of the detection representation of the current video frame to match the object identifier of the detection representation of the previous video frame. For example, the stream manager 114 may update the object identifier of the detection representation 116(9) to match the object identifier of the detection representation 116(5). In particular, the multi-pass object tracking system 104 may update or generate second pass information 122 to reflect that the object identifier of the detection representation 116(9) is equal to the object identifier of the detection representation 116(5).

At block 312, the multi-pass object tracking system 104 may mark both detection representations as processed. As result, neither of the detection representations 116(5) and 116(9) will selectable by the feed manager for the remainder of the comparison procedure performed over the detection representations of the current video frame and the previous video frame. At block 308, the multi-pass object tracking system 104 may determine whether there is an unverified detection representation within the current video frame and an unverified detection representation within the previous video frame that have not been compared. If the multi-pass object tracking system 104 determines there is a combination of unverified detection representations that have not been compared, the multi-pass object tracking system 104 may proceed to block 314. Otherwise, the multi-pass object tracking system 104 may proceed to block 316.

At block 314, the multi-pass object tracking system 104 may identify a combination of an unverified detection representation within the current video frame and an unverified detection representation within the previous video frame that have not been compared, and proceed to block 304 where the stream manager 114 may determine whether the combination of unverified detection representations are similar. For example, the stream manager 114 may determine that the detection representation 116(6) and detection representation 116(10) are both unverified and have not been compared. In response, the stream manager 114 may determine whether the detection representation 116(6) and detection representation 116(10) are similar via the similarity platform 128.

At block 316, the multi-pass object tracking system 104 may confirm that all of the remaining detection representations have a unique object identifier. For example, the stream manager 114 may determine that the detection representation 116(13) is the only detection representation 116 of the current video frame 106(2) that does not match one of the detection representation 116(5)-(8) of the previous video frame 106(3). Further, the stream manager 114 may confirm that the object identifier assigned to the detection representation 116(13) by the multiple object tracker 110 or feed manager 112 is not shared with any other detection representations from the current video frame or previous video frame given that the stream manager 114 failed to identify a match with one of the detection representations 116(5)-(8) of the previous video frame 106(3) captured by the other video capture device 102(2).

At 318, the multi-pass object tracking system 104 may process the next frame. For example, the video capture device 102(3) may capture the video frame 106(5). Further, the stream manager 114 may perform the method 300 with the video frame 106(5) as the current video frame and the video frame 106(3) as the previous video frame.

Figure 4:
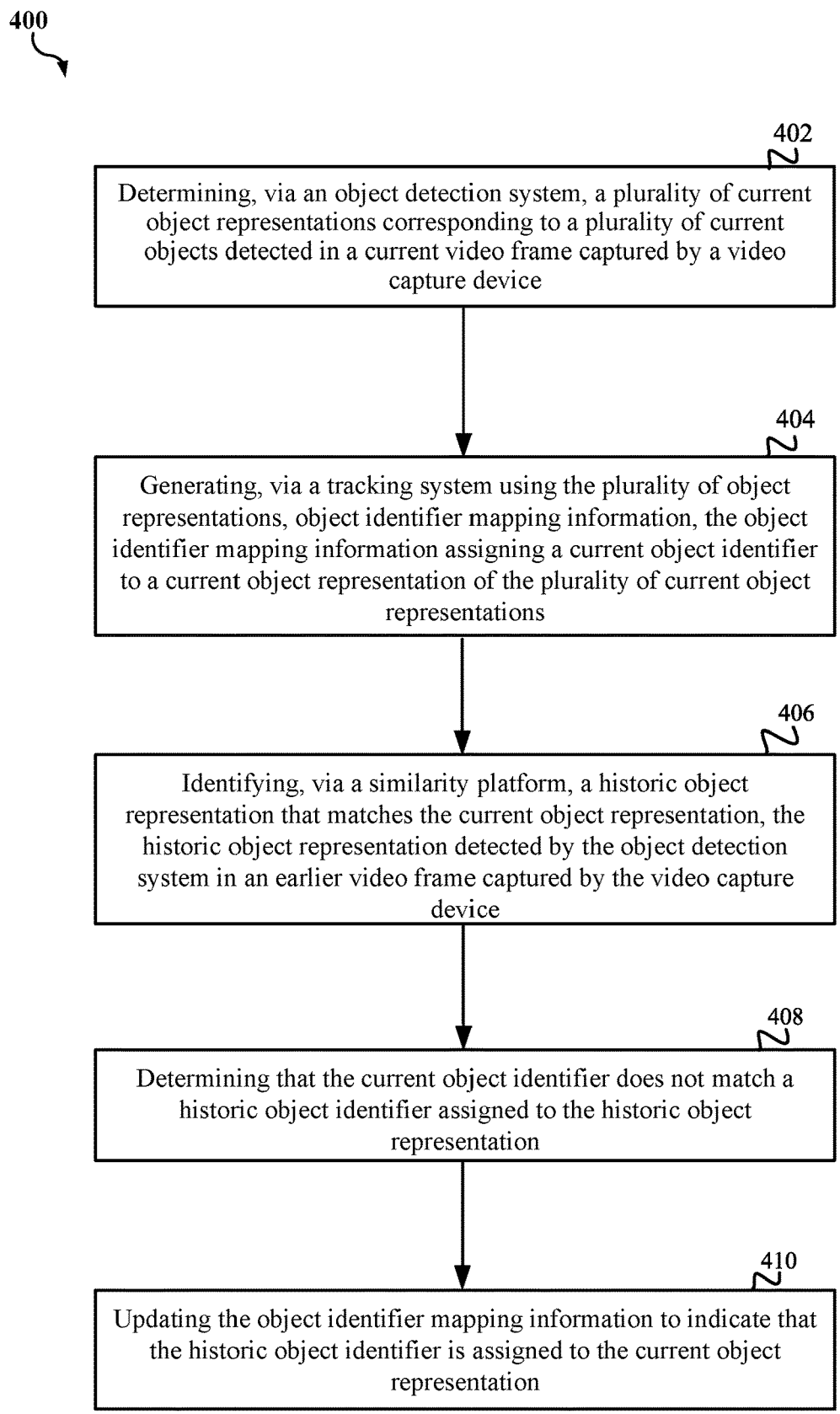
FIG. 4 is a flow diagram of an example method of multi-pass object tracking, according to some implementations.

FIG. 4 is a flow diagram of an example method of multi-pass object tracking, according to some implementations.

Referring to FIG. 4, in operation, the multi-pass object tracking system 104 or computing device 500 may perform an example method 400 for multi-pass object tracking. The method 400 may be performed by one or more components of the multi-pass object tracking system 104, the computing device 500, or any device/component described herein according to the techniques described with reference to FIG. 1.

At block 402, the method 400 includes determining, via an object detection system, a plurality of current object representations corresponding to a plurality of current objects detected in a current video frame captured by a video capture device. For example, the multiple object detector 108 may generate the detection representations 116(17)-(20) corresponding to a plurality of objects detected in the video frame 106(6).

At block 404, the method 400 includes generating, via a tracking system using the plurality of object representations, object identifier mapping information, the object identifier mapping information assigning a current object identifier to a current object representation of the plurality of current object representations. For example, the multiple object tracker 110 may assign object identifiers to the detection representations 116(17)-(20) based on a trajectory-based multiple object tracking process. In particular, the multiple object tracker 110 may determine that the detection representation 116(17) within video frame 106(6) does not match one of the detection representations 116(15)-(16) within the video frame 106(5). Consequently, the multiple object tracker 110 may assign a new object identifier to the detection representation 116(17).

At block 406, the method 400 includes identifying, via a similarity platform, a historic object representation that matches the current object representation, the historic object representation detected by the object detection system in an earlier video frame captured by the video capture device. For example, the feed manager 112 may compare the detection representation 116(15) within the video frame 106(5) to the detection representation 116(17) within the video frame 106(6), and determine that the detection representation 116(15) is similar to the detection representation 116(17) using the similarity platform 124.

At block 408, the method 400 includes determining that the current object identifier does not match a historic object identifier assigned to the historic object representation. For example, the feed manager 112 may determine that the multiple object tracker 110 did not assign the same object identifier to the detection representation 116(15) and the detection representation 116(17).

At block 410, the method 400 includes updating the object identifier mapping information to indicate that the historic object identifier is assigned to the current object representation. For example, the feed manager 112 set the object identifier of the detection representation 116(17) to the object identifier of the detection representation 116(15) within the second pass information 122.

Figure 5:
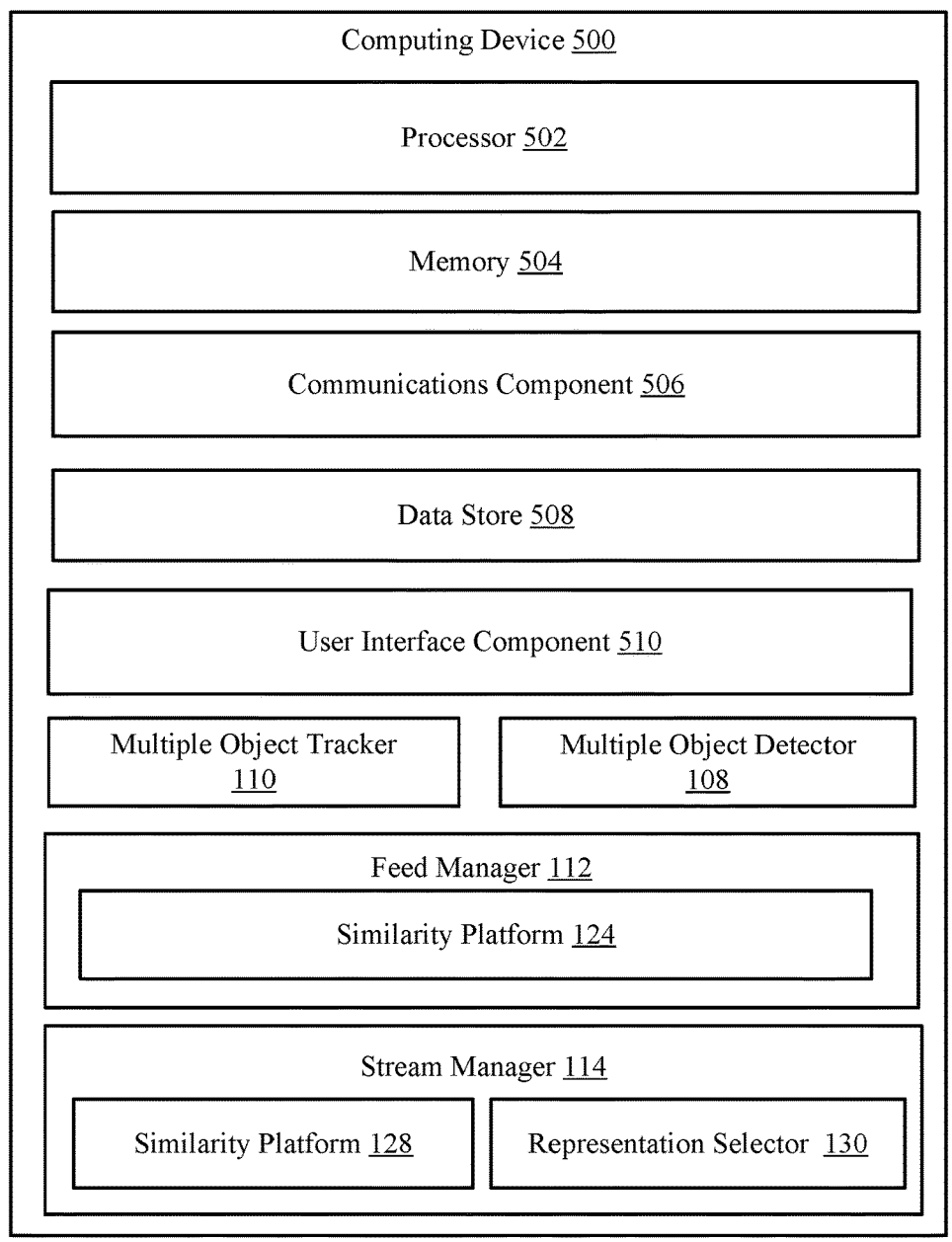
FIG. 5 is block diagram of an example of a computer device configured to implement multi-pass object tracking, according to some implementations.

Referring to FIG. 5, a computing device 500 may implement all or a portion of the functionality described herein. The computing device 500 may be or may include or may be configured to implement the functionality of at least a portion of the system 100, or any component therein. For example, the computing device 500 may be or may include or may be configured to implement the functionality of the plurality of the video capture devices 102 and/or the multi-pass object tracking system 104. The computing device 500 includes a processor 502 which may be configured to execute or implement software, hardware, and/or firmware modules that perform any functionality described herein. For example, the processor 502 may be configured to execute or implement software, hardware, and/or firmware modules that perform any functionality described herein with reference to the multiple object detector 108, multiple object tracker 110, feed manager 112, stream manager 114, or any other component/system/device described herein.

The processor 502 may be a micro-controller, an application-specific integrated circuit (ASIC), a digital signal processor (DSP), or a field-programmable gate array (FPGA), and/or may include a single or multiple set of processors or multi-core processors. Moreover, the processor 502 may be implemented as an integrated processing system and/or a distributed processing system. The computing device 500 may further include a memory 504, such as for storing local versions of applications being executed by the processor 502, related instructions, parameters, etc. The memory 504 may include a type of memory usable by a computer, such as random access memory (RAM), read only memory (ROM), tapes, magnetic discs, optical discs, volatile memory, non-volatile memory, and any combination thereof. Additionally, the processor 502 and the memory 504 may include and execute an operating system executing on the processor 502, one or more applications, display drivers, and/or other components of the computing device 500.

Further, the computing device 500 may include a communications component 506 that provides for establishing and maintaining communications with one or more other devices, parties, entities, etc. utilizing hardware, software, and services. The communications component 506 may carry communications between components on the computing device 500, as well as between the computing device 500 and external devices, such as devices located across a communications network and/or devices serially or locally connected to the computing device 500. In an aspect, for example, the communications component 506 may include one or more buses, and may further include transmit chain components and receive chain components associated with a wireless or wired transmitter and receiver, respectively, operable for interfacing with external devices.

Additionally, the computing device 500 may include a data store 508, which can be any suitable combination of hardware and/or software, that provides for mass storage of information, databases, and programs. For example, the data store 508 may be or may include a data repository for applications and/or related parameters not currently being executed by processor 502. In addition, the data store 508 may be a data repository for an operating system, application, display driver, etc., executing on the processor 502, and/or one or more other components of the computing device 500.

The computing device 500 may also include a user interface component 510 operable to receive inputs from a user of the computing device 500 and further operable to generate outputs for presentation to the user (e.g., via a display interface to a display device). The user interface component 510 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 510 may include one or more output devices, including but not limited to a display interface, a speaker, a haptic feedback mechanism, a printer, any other mechanism capable of presenting an output to a user, or any combination thereof.

Further, while the figures illustrate the components and data of the multi-pass object tracking system 104 as being present in a single location, these components and data may alternatively be distributed across different computing devices and different locations in any manner. Consequently, the functions may be implemented by one or more service computing devices, with the various functionality described herein distributed in various ways across the different computing devices 500. Multiple computing devices 500 may be located together or separately, and organized, for example, as virtual servers, server banks and/or server farms. The described functionality may be provided by the servers of a single entity or enterprise, or may be provided by the servers and/or services of multiple different buyers or enterprises.

What is claimed is:

1. A method comprising:
    determining, via an object detection system, a plurality of current object representations corresponding to a plurality of current objects detected in a current video frame captured by a video capture device;
    generating, via a tracking system using the plurality of current object representations, object identifier mapping information, the object identifier mapping information assigning a current object identifier to a current object representation of the plurality of current object representations;
    identifying, via a motion estimation-based similarity platform, a historic object representation that matches the current object representation, the historic object representation detected by the object detection system in an earlier video frame captured by the video capture device;
    determining that the current object identifier does not match a historic object identifier assigned to the historic object representation; and
    updating the object identifier mapping information to indicate that the historic object identifier is assigned to the current object representation.

2. The method of claim 1, further comprising updating a data store of object identifier information to include the object identifier mapping information.

3. The method of claim 1, wherein determining, via the object detection system, the plurality of current object representations comprises generating a bounding box corresponding to a current object of the plurality of current objects detected in the current video frame.

4. The method of claim 1, wherein the current object representation is a first current object representation, the current object identifier is a first current object identifier, the historic object identifier is a first historic object identifier, the historic object representation is a first historic object representation, the object identifier mapping information is first object identifier mapping information, and further comprising:
    generating, via the tracking system using the plurality of current object representations, second object identifier mapping information, the second object identifier mapping information assigning a second current object identifier to a second current object representation of the plurality of current object representations;
    identifying, via the motion estimation-based similarity platform, a second historic object representation that matches the second current object representation, the second historic object representation detected by the object detection system in the earlier video frame captured by the video capture device;
    determining that the second current object identifier matches a second historic object identifier assigned to the second historic object representation; and
    updating the second object identifier mapping information to indicate that the second historic object representation and the current object representation have been matched.

5. The method of claim 1, wherein the current object representation is a first current object representation, the current object identifier is a first current object identifier, the object identifier mapping information is first object identifier mapping information, and further comprising:
    generating, via the tracking system using the plurality of current object representations, second object identifier mapping information, the second object identifier mapping information assigning a second current object identifier to a second current object representation of the plurality of current object representations;

determining, via the motion estimation-based similarity platform, that a plurality of historic object representations do not match the second current object representation;
verifying that the second current object identifier is unique over a plurality of historic object identifiers assigned to the plurality of historic object representations; and
updating a data store of object identifier information to include the second object identifier mapping information, the data store including object identifiers verified by the motion estimation-based similarity platform.

6. The method of claim 1, wherein the current object representation is a first current object representation, the current object identifier is a first current object identifier, the historic object identifier is a first historic object identifier, the historic object representation is a first historic object representation, the object identifier mapping information is first object identifier information, the motion estimation-based similarity platform is a first motion estimation-based similarity platform, the video capture device is a first video capture device, and further comprising:
selecting, based at least in part on timing information, a second historic object representation corresponding to a second historic object detected by the object detection system in an earlier video frame captured by a second video capture device;
identifying, via a second motion estimation-based similarity platform, that the second historic object representation matches a second current object representation of the plurality of current object representations;
determining that a second current object identifier corresponding to the second current object representation does not match a second historic object identifier assigned to the second historic object representation; and
updating second object identifier mapping information to indicate that the second historic object identifier is assigned to the second current object representation.

7. The method of claim 1, wherein the current object representation is a first current object representation, the current object identifier is a first current object identifier, the historic object identifier is a first historic object identifier, the historic object representation is a first historic object representation, the object identifier mapping information is first object identifier information, the motion estimation-based similarity platform is a first motion estimation-based similarity platform, the video capture device is a first video capture device, and further comprising:
determining, via a second motion estimation-based similarity platform, that a plurality of historic object representations do not match a second current object representation having a second current object identifier, the plurality of historic object representations detected by the object detection system in an earlier video frame captured by a second video capture device;
verifying that the second current object identifier is unique over a plurality of historic object identifiers assigned to the plurality of historic object representations; and
updating a data store of object identifier information to include second object identifier mapping information assigning the second current object identifier to the second current object representation, the data store including object identifiers verified by the second motion estimation-based similarity platform.

8. The method of claim 1, wherein the motion estimation-based similarity platform includes a siamese neural network.

9. A system comprising:
a memory storing instructions thereon; and
at least one processor coupled with the memory and configured by the instructions to:
determine, via an object detection system, a plurality of current object representations corresponding to a plurality of current objects detected in a current video frame captured by a video capture device;
generate, via a tracking system using the plurality of current object representations, object identifier mapping information, the object identifier mapping information assigning a current object identifier to a current object representation of the plurality of current object representations;
identify, via a motion estimation-based similarity platform, a historic object representation that matches the current object representation, the historic object representation detected by the object detection system in an earlier video frame captured by the video capture device;
determine that the current object identifier does not match a historic object identifier assigned to the historic object representation; and
update the object identifier mapping information to indicate that the historic object identifier is assigned to the current object representation.

10. The system of claim 9, wherein the at least one processor is further configured by the instructions to update a data store of object identifier information to include the object identifier mapping information.

11. The system of claim 9, wherein to determine, via the object detection system, the plurality of current object representations, the at least one processor is further configured by the instructions to:
generate a bounding box corresponding to a current object of the plurality of current objects detected in the current video frame.

12. The system of claim 9, wherein the current object representation is a first current object representation, the current object identifier is a first current object identifier, the historic object identifier is a first historic object identifier, the historic object representation is a first historic object representation, the object identifier mapping information is first object identifier mapping information, and the at least one processor is further configured by the instructions to:
generate, via the tracking system using the plurality of current object representations, second object identifier mapping information, the second object identifier mapping information assigning a second current object identifier to a second current object representation of the plurality of current object representations;
identify, via the motion estimation-based similarity platform, a second historic object representation that matches the second current object representation, the second historic object representation detected by the object detection system in the earlier video frame captured by the video capture device;
determine that the second current object identifier matches a second historic object identifier assigned to the second historic object representation; and
update the second object identifier mapping information to indicate that the second historic object representation and the current object representation have been matched.

13. The system of claim 9, wherein the current object representation is a first current object representation, the current object identifier is a first current object identifier, the object identifier mapping information is first object identifier mapping information, and the at least one processor is further configured by the instructions to:
 generate, via the tracking system using the plurality of current object representations, second object identifier mapping information, the second object identifier mapping information assigning a second current object identifier to a second current object representation of the plurality of current object representations;
 determine, via the motion estimation-based similarity platform, that a plurality of historic object representations do not match the second current object representation;
 verify that the second current object identifier is unique over a plurality of historic object identifiers assigned to the plurality of historic object representations; and
 update a data store of object identifier information to include the second object identifier mapping information, the data store including object identifiers verified by the motion estimation-based similarity platform.

14. The system of claim 9, wherein the current object representation is a first current object representation, the current object identifier is a first current object identifier, the historic object identifier is a first historic object identifier, the historic object representation is a first historic object representation, the object identifier mapping information is first object identifier information, the motion estimation-based similarity platform is a first motion estimation-based similarity platform, the video capture device is a first video capture device, and the at least one processor is further configured by the instructions to:
 select, based at least in part on timing information, a second historic object representation corresponding to a second historic object detected by the object detection system in an earlier video frame captured by a second video capture device;
 identify, via a second motion estimation-based similarity platform, that the second historic object representation matches a second current object representation of the plurality of current object representations;
 determine that a second current object identifier corresponding to the second current object representation does not match a second historic object identifier assigned to the second historic object representation; and
 update second object identifier mapping information to indicate that the second historic object identifier is assigned to the second current object representation.

15. The system of claim 9, wherein the current object representation is a first current object representation, the current object identifier is a first current object identifier, the historic object identifier is a first historic object identifier, the historic object representation is a first historic object representation, the object identifier mapping information is first object identifier information, the motion estimation-based similarity platform is a first motion estimation-based similarity platform, the video capture device is a first video capture device, and the at least one processor is further configured by the instructions to:
 determine, via a second motion estimation-based similarity platform, that a plurality of historic object representations do not match a second current object representation having a second current object identifier, the plurality of historic object representations detected by the object detection system in an earlier video frame captured by a second video capture device;
 verify that the second current object identifier is unique over a plurality of historic object identifiers assigned to the plurality of historic object representations; and
 update a data store of object identifier information to include second object identifier mapping information assigning the second current object identifier to the second current object representation, the data store including object identifiers verified by the second motion estimation-based similarity platform.

16. The system of claim 9, wherein the motion estimation-based similarity platform includes a siamese neural network.

17. A non-transitory computer-readable device having instructions thereon that, when executed by at least one computing device, causes the at least one computing device to perform operations comprising:
 determining, via an object detection system, a plurality of current object representations corresponding to a plurality of current objects detected in a current video frame captured by a video capture device;
 generating, via a tracking system using the plurality of current object representations, object identifier mapping information, the object identifier mapping information assigning a current object identifier to a current object representation of the plurality of current object representations;
 identifying, via a motion estimation-based similarity platform, a historic object representation that matches the current object representation, the historic object representation detected by the object detection system in an earlier video frame captured by the video capture device;
 determining that the current object identifier does not match a historic object identifier assigned to the historic object representation; and
 updating the object identifier mapping information to indicate that the historic object identifier is assigned to the current object representation.

18. The non-transitory computer-readable device of claim 17, wherein the current object representation is a first current object representation, the current object identifier is a first current object identifier, the historic object identifier is a first historic object identifier, the historic object representation is a first historic object representation, the object identifier mapping information is first object identifier information, and the operations further comprise:
 generating, via the tracking system using the plurality of current object representations, second object identifier mapping information, the second object identifier mapping information assigning a second current object identifier to a second current object representation of the plurality of current object representations;
 identifying, via the motion estimation-based similarity platform, a second historic object representation that matches the second current object representation, the second historic object representation detected by the object detection system in the earlier video frame captured by the video capture device;
 determining that the second current object identifier matches a second historic object identifier assigned to the second historic object representation; and
 updating the second object identifier mapping information to indicate that the second historic object representation and the current object representation have been matched.

19. The non-transitory computer-readable device of claim 17, wherein the current object representation is a first current object representation, the current object identifier is a first current object identifier, the object identifier mapping information is first object identifier mapping information, and the operations further comprise:
- generating, via the tracking system using the plurality of current object representations, second object identifier mapping information, the second object identifier mapping information assigning a second current object identifier to a second current object representation of the plurality of current object representations;
- determining, via the motion estimation-based similarity platform, that a plurality of historic object representations do not match the second current object representation;
- verifying that the second current object identifier is unique over a plurality of historic object identifiers assigned to the plurality of historic object representations; and
- updating a data store of object identifier information to include the second object identifier mapping information, the data store including object identifiers verified by the motion estimation-based similarity platform.

20. The non-transitory computer-readable device of claim 17, wherein the current object representation is a first current object representation, the current object identifier is a first current object identifier, the historic object identifier is a first historic object identifier, the historic object representation is a first historic object representation, the object identifier mapping information is first object identifier information, the motion estimation-based similarity platform is a first motion estimation-based similarity platform, the video capture device is a first video capture device, and the operations further comprise:
- selecting, based at least in part on timing information, a second historic object representation corresponding to a second historic object detected by the object detection system in an earlier video frame captured by a second video capture device;
- identifying, via a second motion estimation-based similarity platform, that the second historic object representation matches a second current object representation of the plurality of current object representations;
- determining that a second current object identifier corresponding to the second current object representation does not match a second historic object identifier assigned to the second historic object representation; and
- updating second object identifier mapping information to indicate that the second historic object identifier is assigned to the second current object representation.

* * * * *